(12) United States Patent
Horikawa et al.

(10) Patent No.: US 9,946,080 B2
(45) Date of Patent: Apr. 17, 2018

(54) DISPLAY METHOD AND DISPLAY APPARATUS

(71) Applicant: OLYMPUS CORPORATION, Hachioji-shi, Tokyo (JP)

(72) Inventors: Yoshiaki Horikawa, Hachioji (JP); Toshiaki Suzuki, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/345,894

(22) Filed: Nov. 8, 2016

(65) Prior Publication Data

US 2017/0052380 A1  Feb. 23, 2017

Related U.S. Application Data

(63) Continuation of application No. PCT/JP2015/054379, filed on Feb. 18, 2015.

(30) Foreign Application Priority Data

May 9, 2014  (JP) ................................. 2014-098056

(51) Int. Cl.
*G02B 27/10*  (2006.01)
*G02B 27/02*  (2006.01)
(Continued)

(52) U.S. Cl.
CPC ......... *G02B 27/027* (2013.01); *G02B 3/0056* (2013.01); *G02B 27/22* (2013.01);
(Continued)

(58) Field of Classification Search
CPC .................................................. G02B 27/027
See application file for complete search history.

(56) References Cited

U.S. PATENT DOCUMENTS

| 2011/0228231 A1 | 9/2011 | Schreiber et al. |
| 2014/0055863 A1 | 2/2014 | Inoguchi |
| 2014/0146290 A1* | 5/2014 | Sieler .................. G03B 21/001 |
| | | 353/30 |

FOREIGN PATENT DOCUMENTS

| JP | 10170860 A | 6/1998 |
| JP | 2009063624 A | 3/2009 |

(Continued)

OTHER PUBLICATIONS

International Search Report (ISR) and Written Opinion dated May 19, 2015 issued in International Application No. PCT/JP2015/054379.

(Continued)

*Primary Examiner* — Joseph P Martinez
(74) *Attorney, Agent, or Firm* — Holtz, Holtz & Volek PC

(57) ABSTRACT

There is provided a practically useful display method that allows viewers to see in-focus images easily. The method includes the steps of providing a lens array including a plurality of lenses, providing display areas at least one of which corresponds to each of the plurality of lenses, displaying partial images of an original image in the display areas respectively, the partial images being different from one another but partially including a same image portion, forming a bundle of beams by beams respectively emergent from the plurality of lenses equivalently, forming virtual images of the respective partial images displayed in the respective display areas by the respective lenses, and forming a single virtual image by superposing the virtual images of the partial images displayed in the respective corresponding display areas formed by the plurality of lenses.

22 Claims, 10 Drawing Sheets

(51) Int. Cl.
*G02F 1/13* (2006.01)
*G02B 27/22* (2018.01)
*G09F 9/00* (2006.01)
*G02B 3/00* (2006.01)
*G02F 1/31* (2006.01)

(52) U.S. Cl.
CPC ............. *G02F 1/13* (2013.01); *G02F 1/31* (2013.01); *G09F 9/00* (2013.01)

(56) References Cited

FOREIGN PATENT DOCUMENTS

| | | | |
|---|---|---|---|
| JP | 2012530263 | A | 11/2012 |
| JP | 2013003396 | A | 1/2013 |
| JP | 2014041281 | A | 3/2014 |
| WO | 2007048197 | A1 | 5/2007 |
| WO | 2012156280 | A1 | 11/2012 |
| WO | 2013118328 | A1 | 8/2013 |

OTHER PUBLICATIONS

Douglas Lanman, et al., "Near-Eye Light Field Displays", Proc. SIGGRAPH' 13 Article No. 10, 2013, 10 Pages.
International Preliminary Report on Patentability (IPRP) and Written Opinion dated Nov. 24, 2016, issued in counterpart International Application No. PCT/JP2015/054379.

* cited by examiner

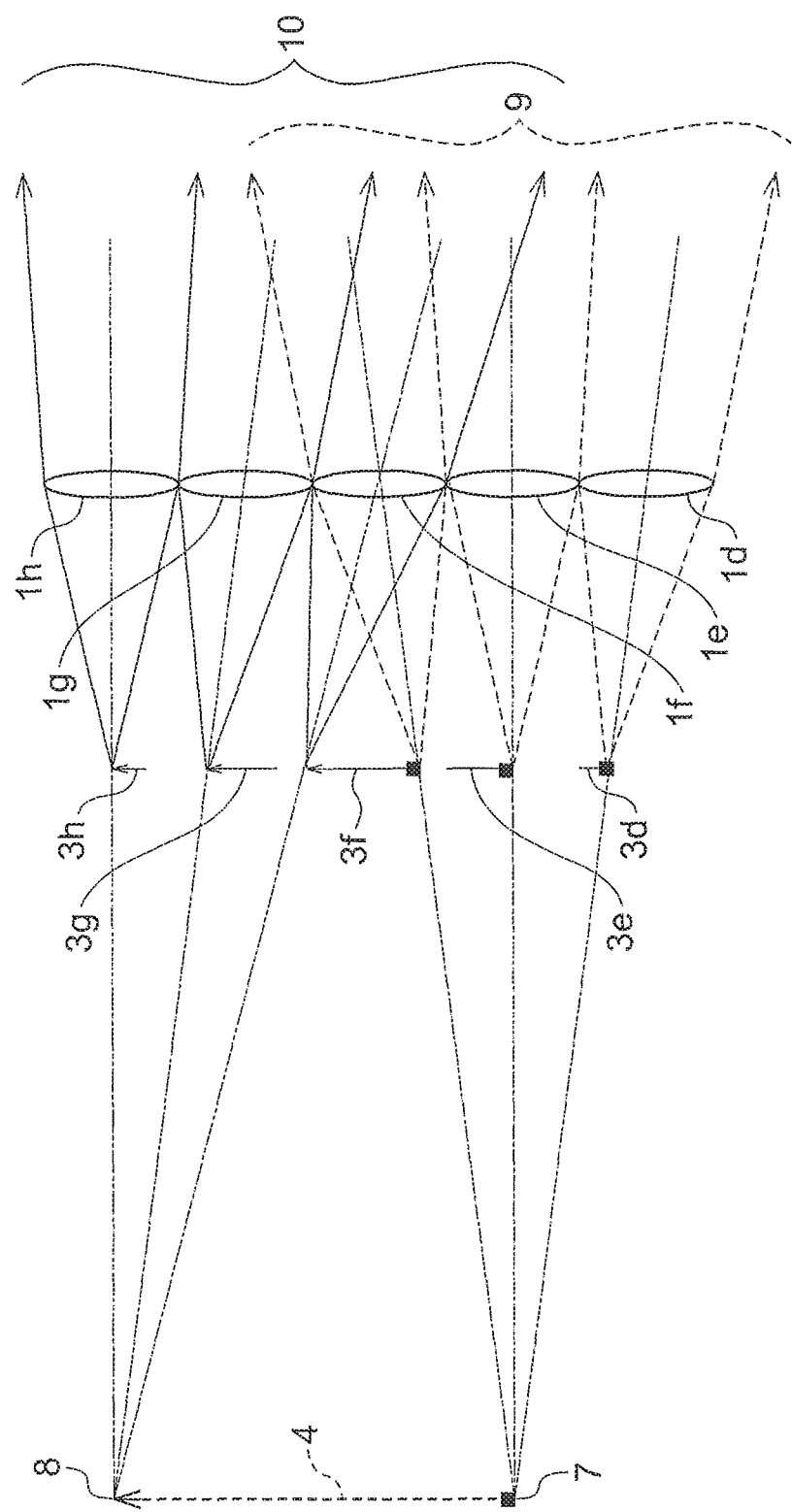

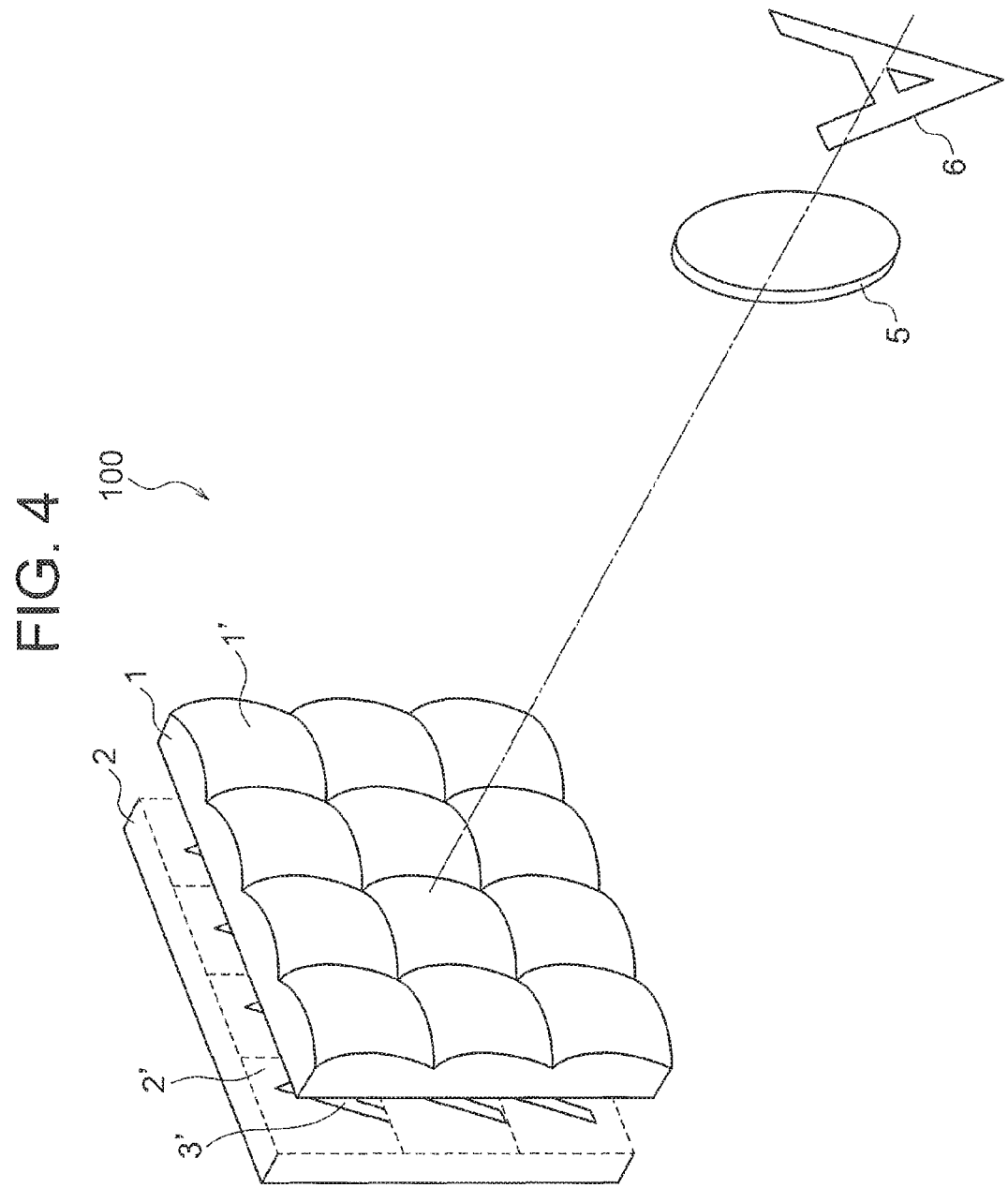

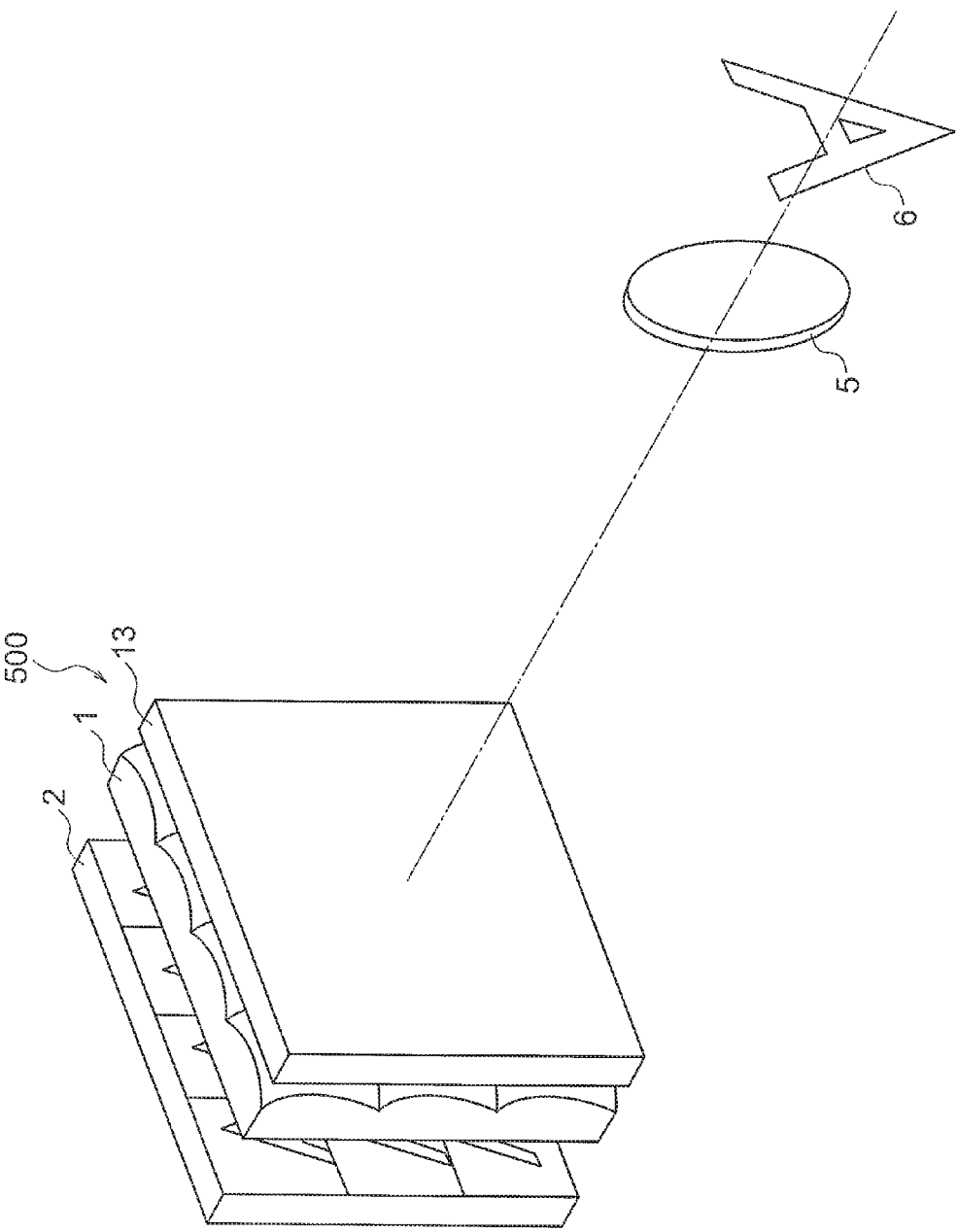

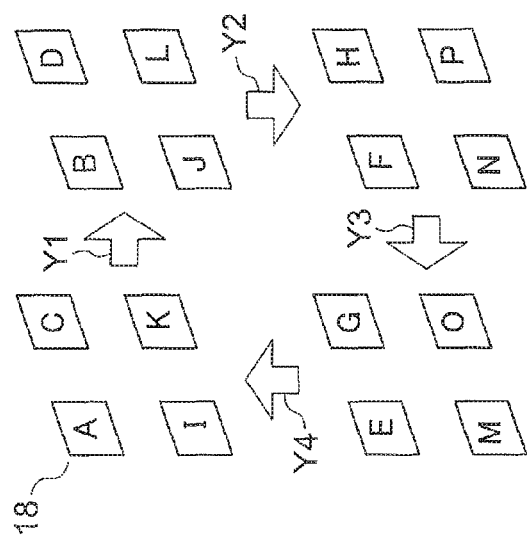
FIG. 8A
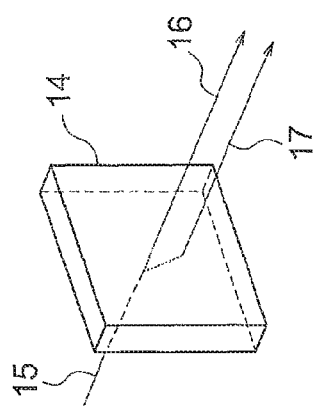
FIG. 8B
FIG. 8C

DISPLAY METHOD AND DISPLAY APPARATUS

CROSS-REFERENCE TO RELATED APPLICATION

The present application is a continuation application of PCT/JP2015/054379 filed on Feb. 18, 2015, which is based upon and claims the benefit of priority from Japanese Patent Application No. 2014-098056 filed on May 9, 2014; the entire contents of which are incorporated herein by reference.

BACKGROUND OF THE INVENTION

Field of the Invention

The present invention relates to a display method and a display apparatus.

Description of the Related Art

Liquid crystal displays and plasma displays have been used as display apparatuses for displaying images and characters. These display apparatuses do not have the function of diopter adjustment.

In recent aging societies, there are many people who suffer from presbyopia. Hence, there is a demand for display apparatuses that allow diopter adjustment, in particular flat panel displays (which will also be referred to as "FPD" hereinafter) that allow diopter adjustment.

For the sake of explanation, a case with presbyopia will be described by way of example. With proliferation of cellular phones and digital cameras, people view FPDs outdoors in many occasions. It is very troublesome for a person to put on reading glasses, or farsighted glasses every time he or she views an FPD of a mobile device such as a cellular phone or a digital camera and to take off them after that.

In the case of cellular phones, people view the FPD when sending or reading mails or playing video games on the cellular phones.

FPDs are also used in digital single lens reflex cameras as live view monitors. When using a digital single lens reflex camera, it is not practical to put on reading glasses to view the live view monitor and to take off them to view a distant object. Moreover, there are many occasions that require a user to view the monitor to use the graphical user interface (GUI) on the monitor to change setting such as the shooting mode.

In the case of car navigation systems, a user is typically driving a car when viewing the monitor. Therefore, it is unsafe to put on reading glasses to view the monitor from front and to take off them after that. It is practically impossible to put on reading glasses and take off them in such an occasion.

Moreover, in the case of liquid crystal displays of personal computers, it is troublesome for a user to put on reading glasses to view the monitor screen. Hence, there is a demand for electronic devices that allow a user to view the monitor without the need to put on reading glasses.

For example, WO2013/118328 discloses a display apparatus that displays a virtual image using a lens array and a display device in combination.

Douglas Lanman and David Luebke 'Near-Eye Light Field Displays' discloses a near-eye light field displays.

SUMMARY OF THE INVENTION

A display method for displaying a virtual image according to a first aspect of the present invention comprises:

providing a lens array including a plurality of lenses;

providing display areas at least one of which corresponds to each of the plurality of lenses, displaying partial images of an original image in the display areas respectively, the partial images being different from one another but partially including a same image portion, forming a bundle of beams by beams respectively emergent from the plurality of lenses equivalently, forming virtual images of the respective partial images displayed in the respective display areas by the respective lenses, and forming a single virtual image by superposing the virtual images of the partial images displayed in the respective corresponding display areas formed by the plurality of lenses.

A display apparatus for displaying a virtual image according a second aspect of the present invention comprises:

a display device having pixels; and a lens array including a plurality of lenses, wherein the display device has display areas at least one of which corresponds to each of the plurality of lenses, partial images of an original image are displayed in the display areas respectively, the partial images are different from one another but partially include a same image portion, beams respectively emergent from the plurality of lenses gather to form an equivalent bundle of beams, the lenses form virtual images of the respective partial images displayed in the respective display areas respectively, and the virtual images of the partial images displayed in the respective corresponding display areas formed by the plurality of lenses are superposed to form a single virtual image.

BRIEF DESCRIPTION OF THE DRAWINGS

FIG. 2 specifically shows bundles of beams formed by lenses in a lens array;

FIG. 4 is a diagram schematically showing a display apparatus based on the display method according to the first embodiment;

FIG. 7 is a diagram schematically showing a display apparatus according to a fifth embodiment;

FIGS. 8A, 8B, and 8C are diagrams illustrating a shift function;

DETAILED DESCRIPTION OF THE INVENTION

In the following, embodiments of the display method and display apparatus according to the present invention will be described specifically with reference to the drawings. It should be understood that the present invention is not limited by the embodiments.

First Embodiment

Figure 1:
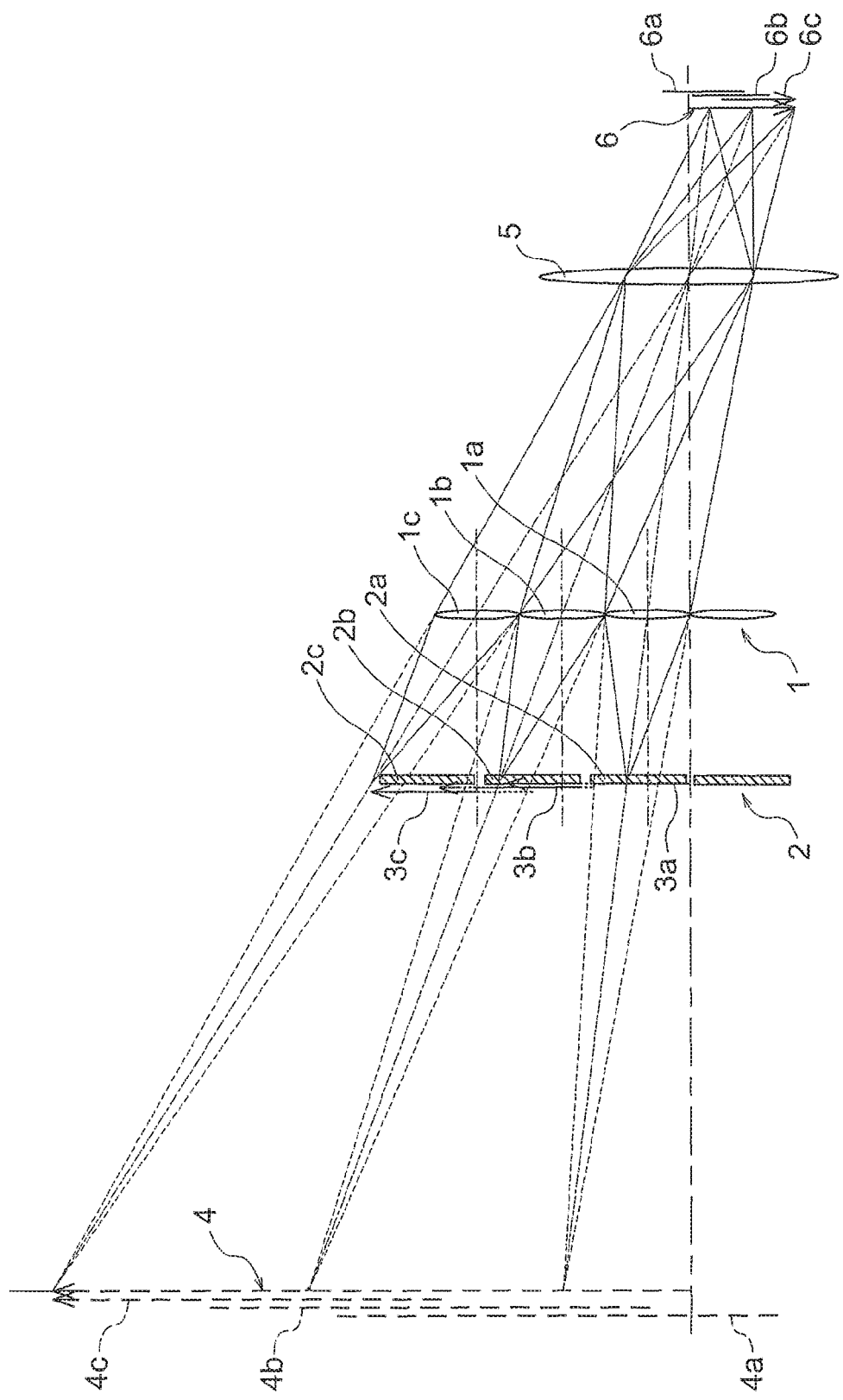
FIG. 1 is a diagram illustrating the basic concept and operation of a display method according to a first embodiment.

FIG. 1 is a diagram illustrating the basic concept and operation of the display method and display apparatus according to the present invention.

According to the display method of this embodiment, portions of partial images 3a, 3b, and 3c of an original image (e.g. an arrow in FIG. 1) represented by the solid line portions of arrows are displayed in display areas (e.g. display areas 2a, 2b, and 2c) of a display device 2 corresponding to lenses (e.g. lenses 1a, 1b, and 1c) in a lens array 1.

The partial images represent different portions of the original image respectively. The lenses 1a, 1b, and 1c respectively form virtual images 4a, 4b, and 4c of the portions of the partial images 3a, 3b, and 3c displayed in the respective display areas 2a, 2b, and 2c represented by the solid line portions of the arrows.

The virtual images of the partial images formed by the plurality of lenses 1a, 1b, and 1c are superposed to form a single virtual image 4. In other words, images of the partial images are arranged in such a way that a single virtual image of the portions of the partial images 3a, 3b, 3c represented by the solid line portions of the arrows is formed by the lenses 1a, 1b, and 1c in the lens array 1.

The positions of the display areas 2a, 2b, and 2c and the positions of the corresponding lenses 1a, 1b, and 1C are in one-to-one correspondence, and the positions of the display areas and the positions of the corresponding lenses are shifted a little from each other. The amount of shift of the display areas and the corresponding lenses increases along the direction from the center of the display apparatus toward the periphery.

When the display is viewed by a viewer (not shown), an image 6 is formed on the retina of the viewer by the lens 5 of the viewer's eye. The image 6 is made up of the images 6a, 6b, and 6c of the respective partial images. It should be noted that the number of lenses in the lens arrays 1 is not limited to three. Actually the lens arrays are arranged two-dimensionally.

FIG. 2 specifically illustrates bundles of beams formed by the lenses in the lens array 1. A virtual image 4 of partial images 3d, 3e, 3f, 3g, and 3h displayed in display areas is formed by lenses 1d, 1e, 1f, 1g, and 1h respectively. Beams coming from the lower end 7 of the virtual image 4 and passing through the lenses 1d, 1e, and 1f form a bundle of beams 9.

Beams coming from the upper end 8 of the virtual image 4 and passing through the lenses 1f, 1g, and 1h form another bundle of beams 10. Since the size of the bundle of beams by which an image is displayed is large, the displayed virtual image can be viewed easily without the need to fix the position of the eye relative to the display apparatus.

The lens array 1 and the display device 2 constitute a virtual image display optical system of the display apparatus of this embodiment. The lens array 1 may be considered to be a pupil of the virtual image display optical system of the display apparatus. As is well known, when using a microscope, it is necessary to look into the eyepiece, because the pupil of the optical system is located only in the vicinity of the eyepiece.

To see an image, it is necessary to locate the lens of the eye at the position of the aforementioned pupil. Therefore, when using an optical device such as a microscope, it is necessary to look into it. In the case of the display apparatus according to the embodiment, in contrast, it is not necessary for the viewer to look into it, but the viewer can see the display at the distance of distinct vision thanks to the large bundle of beams, as with normal FPDs. This is because it may be considered that small pupils are combined into a large pupil by the lenses 1a, 1b, and 1c in the lens array 1.

According to a preferred mode of the present invention, it is desirable that the display device 2 be made of a single integral element. This can make the apparatus compact. Specifically, a plurality of display devices, each of which can display a letter "A" corresponding to a plurality of areas, are integrated into a single display device. In other words, the display area of a normal display device is divided into a plurality of display areas, which serve as the aforementioned display areas.

In FIG. 2, since the image displaying the lower end 7 is not included in the partial images 3g and 3h, beams coming from the lenses 1g or 1h are not included in the bundle of beams 9. Likewise, since the image displaying the upper end 8 is not included in the partial images 3d and 3e, beams coming from the lenses 1d or 1e are not included in the bundle of beams 10.

As above, the entirety of the image (original image) is not displayed by every lens, but each lens contributes to a portion of image display. This enables a reduction of the required number of pixels of the display device. Since images near the center of the display apparatus are displayed by lenses near the center and images near the periphery of the display apparatus are displayed by lenses located near the periphery, the entire image can be viewed easily.

Figure 3A:
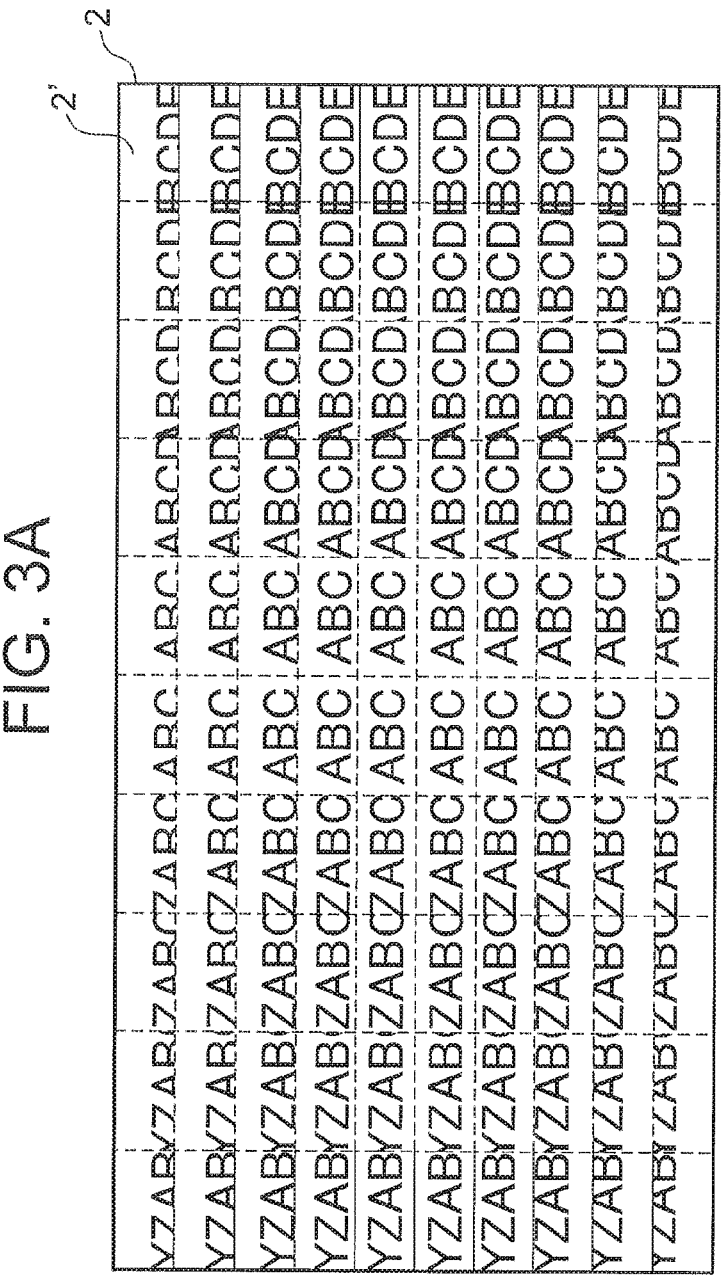
FIGS. 3A and 3B show an exemplary display.
Figure 3B:
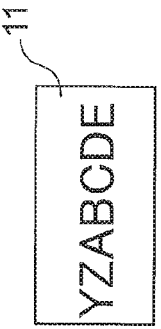

FIGS. 3A and 3B show an exemplary display. FIG. 3A shows the images displayed in the respective display areas 2' of the display device 2 when an original image 11 (which includes seven letters "YZABCD") shown in FIG. 3B is displayed.

As shown in FIG. 3A, while the display areas near the center display only "ABC", the left side display areas and the right side display areas display only "YZAB" and "BCDE" respectively. Displaying only a portion of the original image in each display area enables a reduction in the number of pixels needed to achieve required display.

FIG. 4 shows an exemplary display apparatus 100 based on the display method of this embodiment. The display apparatus 100 includes a lens array 1 and a display device 2. As the display device 2, a liquid crystal display (LCD) or an organic EL display (OELD) that is generally used may be used.

The larger the number of lenses in the lens array 1 is, the smaller the thickness can be made.

The display apparatus according to this embodiment includes:

a display device 2 having pixels; and a lens array 1 including a plurality of lenses 1', wherein the display device 2 has display areas 2' at least one of which corresponds to each of the plurality of lenses 1', partial images of an original image are displayed in the display areas 2' respectively, the partial images are different from one another but partially include a same image portion, beams respectively emergent from the plurality of lenses 1' gather to form an equivalent bundle of beams, the lenses 1' form virtual images of the respective partial images displayed in the respective display areas 2' respectively, and the virtual images of the partial images displayed in the respective corresponding display areas 2' formed by the plurality of lenses 1' are superposed to form a single virtual image.

The "partial image" refers to an image of a portion of the original image.

According to a preferred mode of the present invention, the display area includes a plurality of pixels, and when the virtual images overlap, it is desirable that the pixels of plurality of display areas overlap. This enables a viewer to view a virtual image in focus.

In the display device 2, a display 3' is provided in the display area 2', whose boundaries are indicated by broken lines, arranged at a position corresponding to each lens 1' in the lens array 1. The display 3' is a partial image of the original image, which is the entire image to be displayed.

The partial images are different from one another. The partial images are selected in such a way that the virtual image collectively formed by the lenses is viewed as a virtual image of the original image. It should be understood that the broken lines indicating the boundaries of the display area 2' of the display device 2 in FIG. 4 are drawn to facilitate understanding, and they do not exist actually.

FIG. 4 shows the lens 5 of a viewer's eye and an image 6 formed on the retina of the viewer's eye. The lens 5 of the viewer's eye is focused at a distant point as is the case with presbyopia or farsighted person, and the lens 5 can focus beams from the virtual image displayed at a distance onto the retina. Thus, the eye can see an in-focus image.

The display method will be described in connection with the above-described display apparatus 1.

The display method includes:

providing a lens array 1 including a plurality of lenses 1';

providing display areas 2' at least one of which corresponds to each of the plurality of lenses 1', displaying partial images 3' (i.e. letter "A") of an original image in the display areas 2' respectively, the partial images being different from one another but partially including a same image portion, forming a bundle of beams by beams respectively emergent from the plurality of lenses 1' gather to form an equivalent bundle of beams, forming virtual images of the respective partial images displayed in the respective display areas 2' by the respective lenses 1', and forming a single virtual image 6 by superposing the virtual images of the partial images displayed in the respective corresponding display areas 2' formed by the plurality of lenses 1'.

As shown in FIG. 4, the display apparatus 100 that can display a virtual image according to the embodiment includes the lens array 1 and the display device 2. The size of the display apparatus 100 can be made small.

If the size of the lenses 1' is small, beams emergent from the lenses 1' diverge due to the effect of diffraction, and it is impossible to display a virtual image at a distance. For example, a presbyopic eye has poor ability of accommodation and cannot focus on a near distance point.

If a presbyopic eye can focus at a distance longer than 2 meters and the diameter of the eye lens is 3 millimeters, a divergent angle up to 3 mm/2 m rad is allowable. The divergent angle $\theta$ is generally expressed by the equation $\theta=\lambda/D$, where D is the lens diameter and $\lambda$ is the wavelength of light. If the wavelength is 0.5 micrometer (a typical wavelength of visible light) and $\theta=3/2000$, then D=0.3 millimeter.

Thus, if the diameter of each lens is equal to or larger than 0.3 millimeter, divergence of beams can be kept small. Then, for example, even a presbyopic eye can see an in-focus image. It is preferred that the lens diameter be equal to or larger than 0.3 millimeter.

The optimum value of the lens diameter is 0.3 millimeter in view of the divergence of light by diffraction with the lens.

It is preferred that the upper limit of the lens diameter be 10 millimeters. A diameter larger than 10 millimeters leads to a large NA and a large lens thickness.

An eye with a visual acuity of 0.5 has a resolution of approximately 2 minutes. To achieve this resolution, it is preferred that the lens diameter be equal to or larger than $D=\lambda/\theta=0.55$ μm/2 min=0.9 mm.

According to a preferred mode of the present invention, it is desirable that the distance from the display device 2 to the virtual image be equal to or longer than 2 meters. If the distance from the display device 2 to the virtual image is equal to or longer than 10 meters, a large number of pixels are required. Therefore, it is preferred that the distance from the display device 2 to the virtual image be shorter than 10 meters.

According to a preferred mode of the present invention, it is desirable that the distance from the viewer to the lens array 1 be equal to or shorter than 3 centimeters. Moreover, it is preferred that the upper limit of this distance be smaller than 2 meters. If the distance from the viewer to the lens array 1 is larger than 2 meters, advantages over conventional displays cannot be enjoyed significantly.

According to a preferred mode of the present invention, it is preferred that the width of the eye-box at the location of the viewer be equal to or larger than 11 millimeters. The eye-box is the length of the eyeball of the viewer along its width.

Second Embodiment

Figure 5:
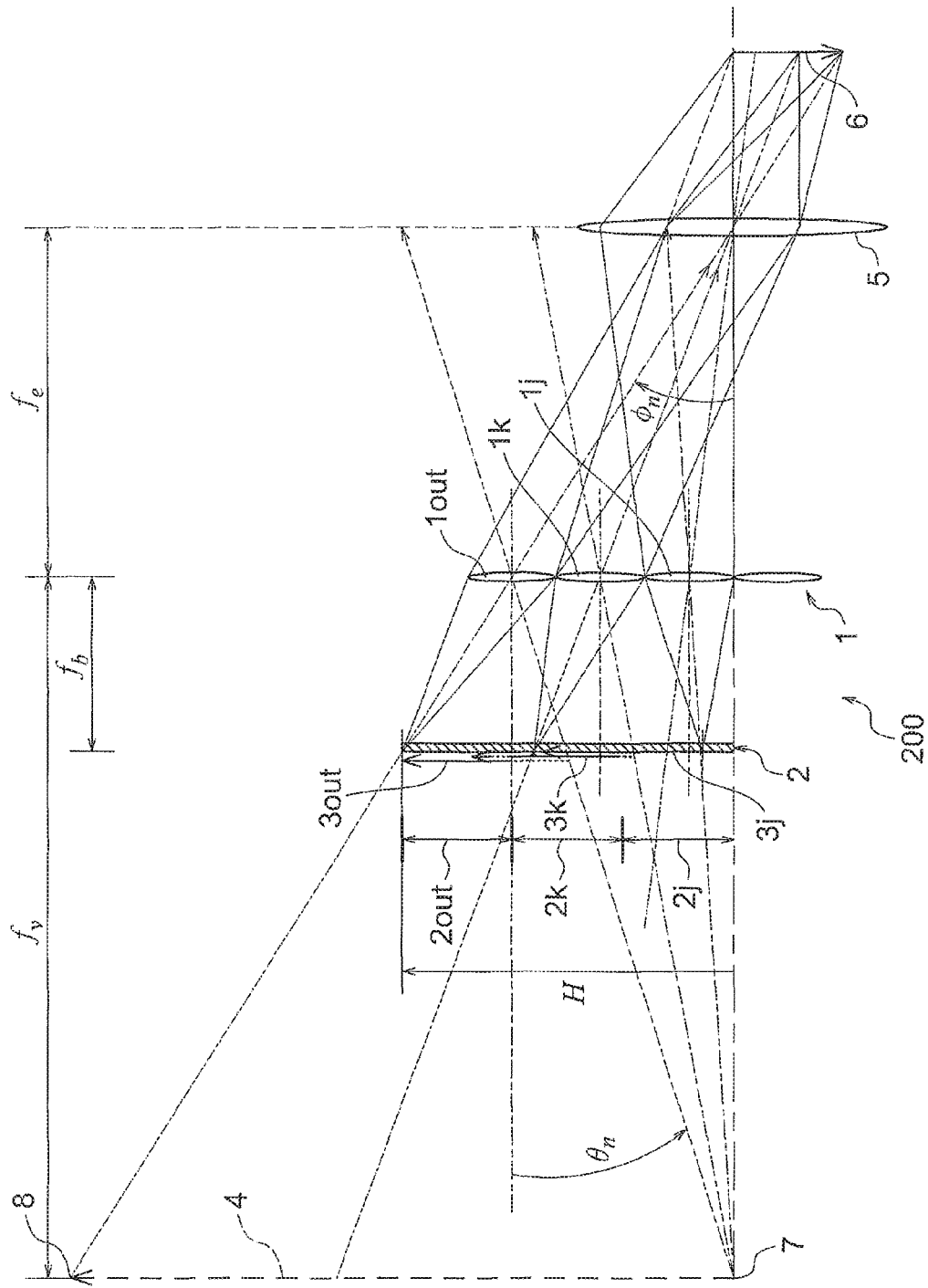
FIG. 5 is a diagram illustrating the basic concept and operation of a display apparatus according to a second embodiment.

FIG. 5 is a diagram illustrating the basic configuration of a display apparatus 200 according to a second embodiment and its operation. Here a viewing distance at which the display apparatus 200 is viewed is assumed. The display apparatus 200 is configured in such a way that a pupil of a virtual display optical system is located at the viewing distance. In the following, a case where the size of a display area is designed to be equal to the height of the display device H representing the half angle of view $\varphi_{nmax}$ that can be viewed by the outermost lens 1out in the lens array 1 divided by the number of lenses.

In FIG. 5, three lenses 1j, 1k, and 1out are illustrated as representatives. The sizes of display areas 2j, 2k, and 2out in display device 2 are all equal to the height H of the display device representing the half angle of view $\varphi_{nmax}$ that can be viewed divided by the number n of the lenses.

Partial images of an original image displayed are represented by arrows 3j, 3k, and 3out. Specifically, the solid line portions of the arrows are displayed. The broken line portions of the arrows are not displayed, because they fall in other adjacent display area. An image 6 is formed on the retina, so that a virtual image 4 is viewed.

In the following, an exemplary method of obtaining partial images to be displayed in the display areas will be described.

In the following description, D is the diameter (or pitch) of the lenses, f is the focal length, $f_e$ is the viewing distance, and $f_v$ is the distance from the display device to the virtual image, where $f_v$ is a finite distance. The position of the rear focal point $f_b$ is expressed by the following equation (1).

$$\frac{1}{f} = \frac{1}{f_b} - \frac{1}{f_v}; \quad (1)$$
$$f_v, f_b > 0$$

The viewing distance fe is set, and the maximum half angles of view $\varphi_{nxmax}$ and $\varphi_{nymax}$ are set. Here, x in the suffix indicates the horizontal direction, and y in the suffix indicates the vertical direction. It is sufficient to consider only one of the horizontal and vertical directions. From FIG. 5, the relationship expressed by the following equation (2) is obtained.

$$\tan\phi_{nmax} = \frac{(n_{max} - 1/2)D}{f_e} = \frac{H}{f_e + f_b} \quad (2)$$

The values of $\varphi_{nmax}$, D, $f_e$, and $f_b$ are determined in such a way as to satisfy equation (2).

The position of the axis of the $n_{max}$-th display area from the optical axis is represented by the following equation (3).

$$(f_v - f_b)\tan\theta_n = (f_v - f_b)\frac{(n - 1/2)D}{f_v} \quad (3)$$

The rendering range of the image $i_{nmax}(x)$ in the $n_{max}$-th display area on the display device 2 is as follows.

$$\frac{n_{max} - 1}{n_{max}}H \text{ to } H \quad (a)$$

The position of the axis of the $n_{max}$-th display area from the optical axis is represented as follows.

$$(f_v - f_b)\frac{(n_{max} - 1/2)D}{f_v} \quad (b)$$

Here, it is assumed that the coordinate value range of the display area of the original image is 0 to 1, namely i(x): x=−1 to 1. Then, the coordinate value of the partial image displayed in the $n_{max}$-th display area is expressed by the following equation (4).

$$x_b = \frac{\frac{n_{max} - 1}{n_{max}}H - (f_v - f_b)\frac{(n_{max} - 1/2)D}{f_v}}{H - (f_v - f_b)\frac{(n_{max} - 1/2)D}{f_v}} = x_b \text{ to } 1 \quad (4)$$

The rendering range of the image $i_n(x)$ in the nth display area is as follows.

$$\frac{n-1}{n_{max}}H \text{ to } \frac{n}{n_{max}}H \quad (c)$$

The coordinate value of the partial image displayed in the nth display area is as follows.

$$x_{nb} = \frac{\frac{n-1}{n_{max}}H - (f_v - f_b)\frac{(n-1/2)D}{f_v}}{H - (f_v - f_b)\frac{(n_{max} - 1/2)D}{f_v}} \text{ to} \quad (5)$$

$$x_{ne} = \frac{\frac{n}{n_{max}}H - (f_v - f_b)\frac{(n-1/2)D}{f_v}}{H - (f_v - f_b)\frac{(n_{max} - 1/2)D}{f_v}}$$

In the following, exemplary numerical values in this embodiment will be given.

The display device used in this embodiment is an FPD having a diagonal length of 11.9 cm (4.7 inches), a number of pixels of 1080×(RGB)×1920, and a pixel pitch of 54 µm. The size of the display area is 58.32×103.68 mm. Moreover, D=1 mm, f=54 mm, $f_e$=200 mm, and $f_v$=2000 mm.

From equation (1), $f_b$=52.68 mm. The values of $n_{max}$ and $\varphi_{nmax}$ are determined in such a way as to satisfy equation (2). In the following, calculation will be carried out in one half of the image. In the vertical direction H=51.84 mm, and in the horizontal direction H=29.16 mm. In the vertical direction $\varphi_{nmax}$=11.56° and $n_{max}$=41, and in the horizontal direction $\varphi_{nmax}$=6.59° and $n_{max}$=24.

The range of the partial image displayed in the nth display area is as follows according to equation (5).

$$x_{nb} = \frac{0.291n - 0.778}{12.405} \text{ to } x_{ne} = \frac{0.291n + 0.478}{12.405} \quad (d)$$

The ranges of partial images for several ns are given below.

| | | | | | |
|---|---|---|---|---|---|
| n = 41: | 0.899-1.000 | range: | 0.101 | overlapping range: | 0.078 |
| n = 40: | 0.876-0.977 | | 0.101 | | |
| n = 24: | 0.500-0.602 | | 0.102 | overlapping range: | 0.078 |
| n = 23: | 0.477-0.578 | | 0.101 | | |
| n = 2: | −0.016-0.085 | | 0.101 | overlapping range: | 0.078 |
| n = 1: | −0.039-0.062 | | 0.101 | | |

It will be understood that a range of one tenth of the image height of the original image is displayed in each partial image. It will also be understood that approximately eight tenths of the partial image overlap the partial image displayed in the adjacent display area. In terms of pixels, since the pixel pitch is 54 µm, the number of pixels of the original image is 12.405/0.054=230.

Hence, the pixel ranges are as follows.

| (24 pixels in one display area) | | | |
|---|---|---|---|
| n = 41: | 0.899-1.000 | displayed pixel number: | 207-230 |
| n = 40: | 0.876-0.977 | | 201-225 |
| n = 24: | 0.500-0.602 | | 115-138 |
| n = 23: | 0.477-0.578 | | 110-133 |
| n = 2: | −0.016-0.085 | | −4-20 |
| n = 1: | −0.039-0.062 | | −9-14 |

The total number of pixels in display is 276×460. Although this is one fourth of the number of pixels of the display device (1080×1920) in both the vertical and horizontal directions, the resolution can be increased greatly as compared to the prior art arrangements in which the same image is displayed in the display areas. The number of lenses in the lens array is 48×82. In the case of the prior art arrangements, the number of pixels that can be displayed is 1080/48×1920/82=22.5×23.4.

The apparatus may be provided with a shift function by which the relative position of the display areas and the lens array is shifted in a direction perpendicular to the optical axis of the lens by a distance equal to half the pixel pitch. With this function, the display of the original image is shifted by a distance equal to half the pixel pitch. This can double the number of pixels displayed in one direction.

In a typical case where display is performed at 60 frames per second, the display rate is multiplied by a factor of 4 to 240 frames per second, and images with a shift by a distance equal to half the pixel pitch of the original image in the horizontal direction and the vertical direction are displayed alternately on the display device in every four frames as shown in FIG. 8B. Thus, the total number of pixels displayed is increased by a factor of four. In other words, 552×920 pixels can be displayed.

The shift function will be described with reference to FIGS. 8A, 8B, and 8C. As shown in FIG. 8A, a birefringent plate 14 composed of transparent electrodes and a birefringent crystal held between them is prepared. When a voltage is applied to the transparent electrodes (not shown) as a ray 15 passes through the birefringent plate 14, an extraordinary ray 17 emerges. When a voltage is not applied to the transparent electrodes, an ordinary ray 16 emerges.

As above, it is possible to shift rays by applying a voltage as shown in FIG. 8A. Moreover, by using a plurality of birefringent plates, it is possible to shift rays two-dimensionally. FIG. 8B schematically shows a display device having four pixels 18. Actually, there are a much larger number of pixels, needless to say.

By providing a birefringent plate 14 in front of this display device, the displayed pixels can be shifted by a distance equal to half the pixel pitch in the horizontal direction by controlling the applied voltage. Likewise, the displayed pixels can be shifted in the vertical direction also.

By controlling the applied voltages sequentially, the pixels of the display device can be shifted in the clockwise order in FIG. 8B, namely in the direction of arrow Y1 to the right, then in the direction of arrow Y2 to the lower right, then in the direction of arrow Y3 to the lower left, and then in the direction of arrow Y4 to the upper left (i.e. back to the initial position). The images ACIK, BDJL, FHNP, and EGMO are displayed in the pixels in order in synchronization with the above-described shift of the pixels. Thus, a high resolution image shown in FIG. 8C can be displayed.

The system for implementing the shift function is not limited to that described above. It is preferred that the system be a mechanical system or an optical switch using liquid crystal.

Third Embodiment

A display apparatus according to a third embodiment of the present invention will be described. The display device used in this embodiment is an FPD having a diagonal length of 30.7 cm (12.1 inches), a number of pixels of 3840×(RGB)×2160, and a pixel pitch of 70 μm. The size of the display area is 268.8×151.2 mm.

Moreover, D=1.72 mm, f=70 mm, $f_e$=300 mm, and $f_v$=2000 mm. From equation (1), $f_b$=67.63 mm. The values of $n_{max}$ and $\varphi_{nmax}$ are determined in such a way as to satisfy equation (2).

In the following, calculation will be carried out in one half of the image. In the horizontal direction H=134.4 mm, and in the vertical direction H=75.6 mm. In the vertical direction $\varphi_{nmax}$=20.4° and $n_{max}$=64, and in the horizontal direction $\varphi_{nmax}$=11.8° and $n_{max}$=36. The range of the partial image displayed in the nth display area is as follows according to equation (5).

$$x_{nb} = \frac{0.4382n - 1.2691}{28.8733} \text{ to } x_{ne} = \frac{0.4382n + 0.8309}{28.8733}$$

Calculated values for several ns are given below.

| | | | | | |
|---|---|---|---|---|---|
| n = 64: | 0.927-1.000 | range: | 0.073 | overlapping range: | 0.058 |
| n = 63: | 0.912-0.985 | | 0.073 | | |
| n = 36: | 0.502-0.575 | | 0.073 | overlapping range: | 0.058 |
| n = 35: | 0.487-0.560 | | 0.073 | | |
| n = 2: | −0.014-0.059 | | 0.073 | overlapping range: | 0.058 |
| n = 1: | −0.029-0.044 | | 0.073 | | |

It will be understood that a range of seven hundredths of the image height of the original image is displayed in each partial image. It will also be understood that approximately eight tenths of the partial image overlap the partial image displayed in the adjacent display area. In terms of pixels, since the pixel pitch is 70 μm, the number of pixels of the original image is 28.8733/0.070=412.

Hence, the pixel ranges are as follows.

| (30 pixels in one display area) | | | |
|---|---|---|---|
| n = 64: | 0.927-1.000 | displayed pixel number: | 382-412 |
| n = 63: | 0.912-0.985 | | 376-406 |
| n = 36: | 0.502-0.575 | | 207-237 |
| n = 35: | 0.487-0.560 | | 201-231 |
| n = 2: | −0.014-0.059 | | −6-24 |
| n = 1: | −0.029-0.044 | | −12-18 |

The total number of pixels in display is 824×474. This is one fourth of the number of pixels of the display device (3840×2160) in both the vertical and horizontal directions. In this embodiment, the resolution can be increased greatly as compared to the prior art arrangements in which the same image is displayed in the display areas. The number of lenses in the lens array is 128×72. In the case of the prior art arrangements, the number of pixels that can be displayed is 3840/128×2160/72=30×30.

It is preferred that the apparatus be provided with a shift function by which the relative position of the display areas and the lens array is shifted in a direction perpendicular to the optical axis of the lens by a distance equal to half the pixel pitch. With this function, the display of the original image can be shifted by a distance equal to half the pixel pitch. This can double the number of pixels displayed in one direction in this embodiment.

In a typical case where display is performed at 60 frames per second, the display rate is set to 240 frames per second, and images with a shift by a distance equal to half the pixel pitch of the original image in the horizontal direction and the vertical direction are displayed alternately on the display device in every four frames. Thus, the total number of pixels displayed is increased by a factor of four. In other words, 1648×948 pixels can be displayed.

Fourth Embodiment

A display apparatus according to a fourth embodiment will be described. It has already been described in the description of the above embodiments that partial images displayed in the respective display areas by the lenses in the lens array are superposed when forming virtual images to form a single virtual image of the original image.

Described here is an embodiment in which the relation between the display device and the lens array is arranged in such a way that pixels overlap with a displacement when a virtual image is displayed, thereby increasing the number of pixels in display by pixel interpolation.

Figure 6A:
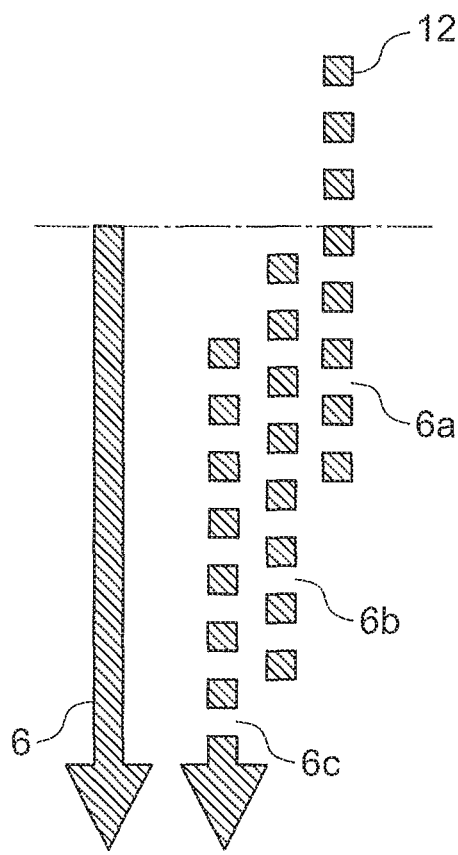
FIGS. 6A and 6B are diagrams illustrating the principle of a fourth embodiment.
Figure 6B:
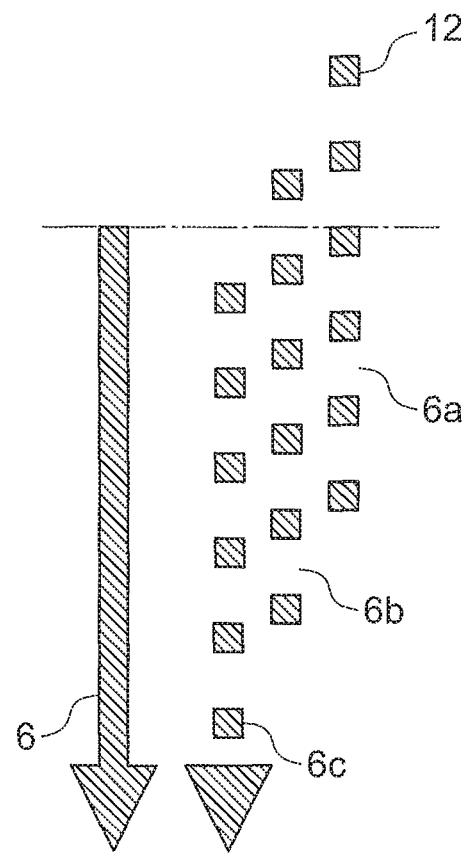

FIGS. 6A and 6B are diagrams illustrating the principle of this embodiment. FIG. 6A shows a portion around the image 6 in FIG. 1 referred to in the description of the first embodiment. FIG. 6A shows a case where pixels overlap with a displacement equal to half the pixel pitch.

Virtual images 6a, 6b, and 6c of the partial images are each composed of 12 pixels. The virtual image 6a and the virtual image 6b are displaced by a distance equal to half the pixel pitch. The virtual image 6b and the virtual image 6c are also displaced by a distance equal to half the pixel pitch. In this case, the virtual image 6a and the virtual image 6c are displayed in an overlapping manner. The virtual images do not overlap in the high image height portion. However, this does not matter because its location is at an end of the image and its range is very small. FIG. 6B shows a case where pixels overlap with a displacement equal to one third of the pixel pitch.

It is not necessary that the distance by which pixels are displaced be exactly equal to half or one third of the pixel pitch, but the displacement may be set to a distance nearly equal to half or one third of the pixel pitch, which enables smooth continuity of pixels.

In the following, exemplary numerical values will be given for the case where virtual images are displaced by a distance equal to half the pixel pitch.

The display device used in this embodiment is an FPD having a diagonal length of 11.9 cm (4.7 inches), a number of pixels of 1080× (RGB)×1920, and a pixel pitch of 54 µm. The size of the display area is 58.32×103.68 mm.

Moreover, D=1 mm, f=18 mm, $f_e$=200 mm, and $f_v$=2000 mm. From equation (1), $f_b$=17.84 mm. The values of $n_{max}$ and $\varphi_{nmax}$ are determined in such a way as to satisfy equation (2). In the following, calculation will be carried out in one half of the image. In the vertical direction H=51.84 mm, and in the horizontal direction H=29.16 mm. In the vertical direction $\varphi_{nmax}$=13.7° and $n_{max}$=48, and in the horizontal direction $\varphi_{nmax}$=7.8° and $n_{max}$=27.

The range of the partial image displayed in the nth display area is as follows according to equation (5).

$$x_{nb} = \frac{0.08892n - 0.58446}{4.7637} \text{ to } x_{ne} = \frac{0.08892n + 0.49554}{4.7637}$$

Calculated values for several ns are given below.

| | | | | | |
|---|---|---|---|---|---|
| n = 48: | 0.773-1.000 | range: | 0.227 | overlapping range: | 0.208 |
| n = 47: | 0.755-0.981 | | 0.226 | | |
| n = 27: | 0.381-0.608 | | 0.227 | overlapping range: | 0.208 |

-continued

| | | | |
|---|---|---|---|
| n = 26: | 0.363-0.589 | 0.226 | |
| n = 2: | −0.085-0.141 | 0.226 | overlapping range: 0.208 |
| n = 1: | −0.104-0.123 | 0.227 | |

A range of twenty-two hundredths of the image height of the original image is displayed in each partial image. Approximately nine tenths of the partial image overlap the partial image displayed in the adjacent display area. In terms of pixels, since the pixel pitch is 54 µm, the number of pixels of the original image is 4.7637/0.054=88.

Hence, the pixel ranges are as follows.

| | | | |
|---|---|---|---|
| n = 48: | 0.773-1.000 | displayed pixel number: | 68.2-88.2 |
| n = 47: | 0.755-0.981 | | 66.6-86.5 |
| n = 46: | 0.736-0.963 | | 64.9-85.0 |
| n = 27: | 0.381-0.608 | | 33.6-53.6 |
| n = 26: | 0.363-0.589 | | 32.0-52.0 |
| n = 2: | −0.085-0.141 | | −7.5-12.4 |
| n = 1: | −0.104-0.123 | | −9.2-10.9 |

It will be understood that virtual images are displayed with a displacement of 0.5 pixel. Therefore, by displaying information of the original image in display areas with a displacement equal to half the pixel pitch, the effective number of pixels can be doubled.

Thus, the total number of pixels in display is 108×176. This is one tenth of the number of pixels of the display device (1080×1920) in both the vertical and horizontal directions. Thus, the focal length of the lenses in the lens array can be made shorter, and the display apparatus can be made slimmer, accordingly. Moreover, the resolution can be increased greatly as compared to the prior art arrangements in which the same image is displayed in the display areas. The number of lenses in the lens array is 54×96. In the case of the prior art arrangements, the number of pixels that can be displayed is 1080/54×1920/96=20×20.

Since the number of overlapping virtual images is 12, and the position of the virtual image is 2000 mm, the size of the bundle of beams at a viewing distance of 200 mm is evaluated to be 12×1×2200/2000=13.2 mm. The diameter of the bundle of beams corresponding to the width of the eye-box described in Douglas Lanman and David Luebke cited in the description of related art is 13.2 mm.

Fifth Embodiment

A display apparatus 500 according to a fifth embodiment will be described.

FIG. 7 is a perspective view of the display apparatus 500. An optical system 13 having a convex lens effect (or positive refractive power) is provided in front or rear of a lens array 1. In this embodiment, the "rear" side refers to the side of the lens array 1 facing a display device 2, and the "front" side refers to the light emergent side of the lens array 1.

The above arrangement enables the position of the virtual image formed by the lens array 1 to be located at a near point. Therefore, the size of the image displayed on the display device can be made large, and the resolution can be increased. It should be noted that the denominator in equation (5) represents the size of the displayed image.

It is preferred that the lenses in the lens array 1 be aspheric lenses, in particular double aspheric lenses.

The proportion of the partial image that can be displayed in the display area to the original image is decreased.

In the apparatus shown in FIG. 7, the optical system 13 having a convex lens effect is provided in front of the lens array 1 (i.e. light emergent side). The optical system 13 having a convex lens effect may be a Fresnel lens 1. The use of a Fresnel lens can make the display apparatus 500 slimmer than in the case where a normal lens is used. The position of the virtual image formed at a near distance point by the lens array is shifted to a distance by the optical system 13 having a convex lens effect 13. Thus, even a presbyopic eye can focus on the image.

In the following, exemplary numerical values in this embodiment will be given.

The display device used in this embodiment is an FPD having a diagonal length of 11.9 cm (4.7 inches), a number of pixels of 1080×(RGB)×1920, and a pixel pitch of 54 μm. The size of the display area is 58.32×103.68 mm. Moreover, D=1 mm, f=18 mm, $f_e$=300 mm, and $f_v$=300 mm.

From equation (1), $f_b$=16.98 mm. The values of $n_{max}$ and $\varphi_{nmax}$ are determined in such a way as to satisfy equation (2). In the following, calculation will be carried out in one half of the image. In the vertical direction H=51.84 mm, and in the horizontal direction H=29.16 mm. In the vertical direction $\varphi_{nmax}$=8.9° and $n_{max}$=49, and in the horizontal direction $\varphi_{nmax}$=5.0° and $n_{max}$=28.

The range of the partial image displayed in the nth display area is as follows according to equation (5).

$$x_{nb} = \frac{0.1007n - 0.5724}{5.4051} \text{ to } x_{ne} = \frac{0.1007n + 0.4717}{5.4051}$$

Calculated values for several ns are given below.

| | | | | | |
|---|---|---|---|---|---|
| n = 49: | 0.807-1.000 | range: | 0.193 | overlapping range: | 0.175 |
| n = 48: | 0.788-0.982 | | 0.194 | | |
| n = 28: | 0.416-0.609 | | 0.193 | overlapping range: | 0.174 |
| n = 27: | 0.397-0.590 | | 0.193 | | |
| n = 2: | −0.069-0.125 | | 0.194 | overlapping range: | 0.175 |
| n = 1: | −0.087-0.106 | | 0.193 | | |

A range of two tenths of the image height of the original image is displayed in each partial image. Approximately nine tenths of the partial image overlap the partial image displayed in the adjacent display area. In terms of pixels, since the pixel pitch is 54 μm, the number of pixels of the original image is 5.4051/0.054=100.

Hence, the pixel ranges are as follows.
n=49: 0.807-1.000 displayed pixel number: 80.7-100 number of pixels: 19.3, number of overlapping pixels: 17.5
n=48: 0.788-0.982 displayed pixel number: 78.8-98.2 number of pixels: 19.4
n=28: 0.416-0.609 displayed pixel number: 41.6-60.9 number of pixels: 19.3, number of overlapping pixels: 17.4
n=27: 0.397-0.590 displayed pixel number: 39.7-59.0 number of pixels: 19.3
n=2: −0.069-0.125 displayed pixel number: −6.9-12.5 number of pixels: 19.4, number of overlapping pixels: 17.5
n=1: −0.087-0.106 displayed pixel number: −8.7-10.6 number of pixels: 19.3

It will be understood that virtual images are displayed with a displacement of one third pixel. Therefore, by displaying information of the original image in display areas with a displacement equal to one third of the pixel pitch, the effective number of pixels can be multiplied by a factor of three.

Thus, the total number of pixels in display is 336×600. This is one third of the number of pixels of the display device 2 (1080×1920) in both the vertical and horizontal directions. Thus, the focal length of the lenses in the lens array 1 can be made shorter, and the display apparatus can be made slimmer, accordingly. Moreover, the resolution can be increased greatly as compared to the prior art arrangements in which the same image is displayed in the display areas.

The number of lenses in the lens array 1 is 56×98. In the case of the prior art arrangements, the number of pixels that can be displayed is 1080/56×1920/98=19×19.5. By using an optical system 13 having a convex lens effect having a focal length of 300 mm, the position of the virtual image can be brought to infinity. Then, for example, even a presbyopic eye that cannot focus at a near point can see an in-focus display image easily.

Since the number of overlapping virtual images is 11, and the position of the virtual image is 2000 mm, the size of the bundle of beams at a viewing distance of 300 mm is evaluated to be 11×1×2300/2000=12.7 mm. The diameter of the bundle of beams corresponding to the width of the eye-box described in Douglas Lanman and David Luebke cited in the description of related art is 12.7 mm.

Sixth Embodiment

A display apparatus according to a sixth embodiment will be described. The display device used in this embodiment is an FPD having a diagonal length of 12.3 cm (4.9 inches), a number of pixels of 7680×(RGB)×4320, and a pixel pitch of 14 μm. The size of the display area is 107.52×60.48 mm. Moreover, D=1 mm, f=14 mm, $f_e$=200 mm, and $f_v$=2000 mm.

From equation (1), $f_b$=13.90 mm. The values of $n_{max}$ and $\varphi_{nmax}$ are determined in such a way as to satisfy equation (2). In the following, calculation will be carried out in one half of the image. In the horizontal direction H=53.76 mm, and in the vertical direction H=30.24 mm. In the horizontal direction $\varphi_{nmax}$=13.2° and $n_{max}$=51, and in the vertical direction $\varphi_{nmax}$=7.5° and $n_{max}$=29. The range of the partial image displayed in the nth display area is as follows according to equation (5).

$$x_{nb} = \frac{0.1236n - 0.5889}{6.770} \text{ to } x_{ne} = \frac{0.1236n + 0.4653}{6.770}$$

Calculated values for several ns are given below.

| | | | | | |
|---|---|---|---|---|---|
| n = 51: | 0.844-1.000 | range: | 0.156 | overlapping range: | 0.138 |
| n = 50: | 0.826-0.982 | | 0.156 | | |
| n = 29: | 0.442-0.598 | | 0.156 | overlapping range: | 0.138 |
| n = 28: | 0.424-0.580 | | 0.156 | | |
| n = 2: | −0.050-0.105 | | 0.155 | overlapping range: | 0.137 |
| n = 1: | −0.069-0.087 | | 0.156 | | |

It will be understood that a range of fifteen hundredths of the image height of the original image is displayed in each partial image. It will also be understood that approximately nine tenths of the partial image overlap the partial image displayed in the adjacent display area. In terms of pixels, since the pixel pitch is 14 μm, the number of pixels of the original image is 6.770/0.054=483.6.

Hence, the pixel ranges are as follows.

n=51: 0.844-1.000 displayed pixel number: 408.1-483.6 number of pixels: 75.5, number of overlapping pixels: 66.8
n=50: 0.826-0.982 displayed pixel number: 399.5-474.9 number of pixels: 75.4
n=29: 0.442-0.598 displayed pixel number: 213.8-289.2 number of pixels: 75.4
n=28: 0.424-0.580 displayed pixel number: 205.0-280.5 number of pixels: 75.5
n=2: −0.050-0.105 displayed pixel number: −24.2-50.8 number of pixels: 75.0
n=1: −0.069-0.087 displayed pixel number: −33.4-42.1 number of pixels: 75.5

It will be understood that virtual images are displayed with a displacement of 0.5 pixel. Therefore, information of the original image is displayed in display areas with a displacement equal to half the pixel pitch. Thus, the effective number of pixels can be doubled in one direction, and the total number of pixels is increased by a factor of four.

Thus, the total number of pixels in display is 967×578. This is one eighth of the number of pixels of the display device (7680×4320) in both the vertical and horizontal directions. Moreover, the focal length of the lenses in the lens array can be made shorter, and the display apparatus can be made slimmer, accordingly. Moreover, the resolution can be increased greatly as compared to the prior art arrangements in which the same image is displayed in the display areas.

The number of lenses in the lens array is 102×58. In the case of the prior art arrangements, the number of pixels that can be displayed is 7680/102×4320/58=75×74.5. The position of the virtual image can be brought to a distance of 2 m. Then, for example, even a presbyopic eye that cannot focus at a near point can see an in-focus display image easily.

Seventh Embodiment

Figure 9:
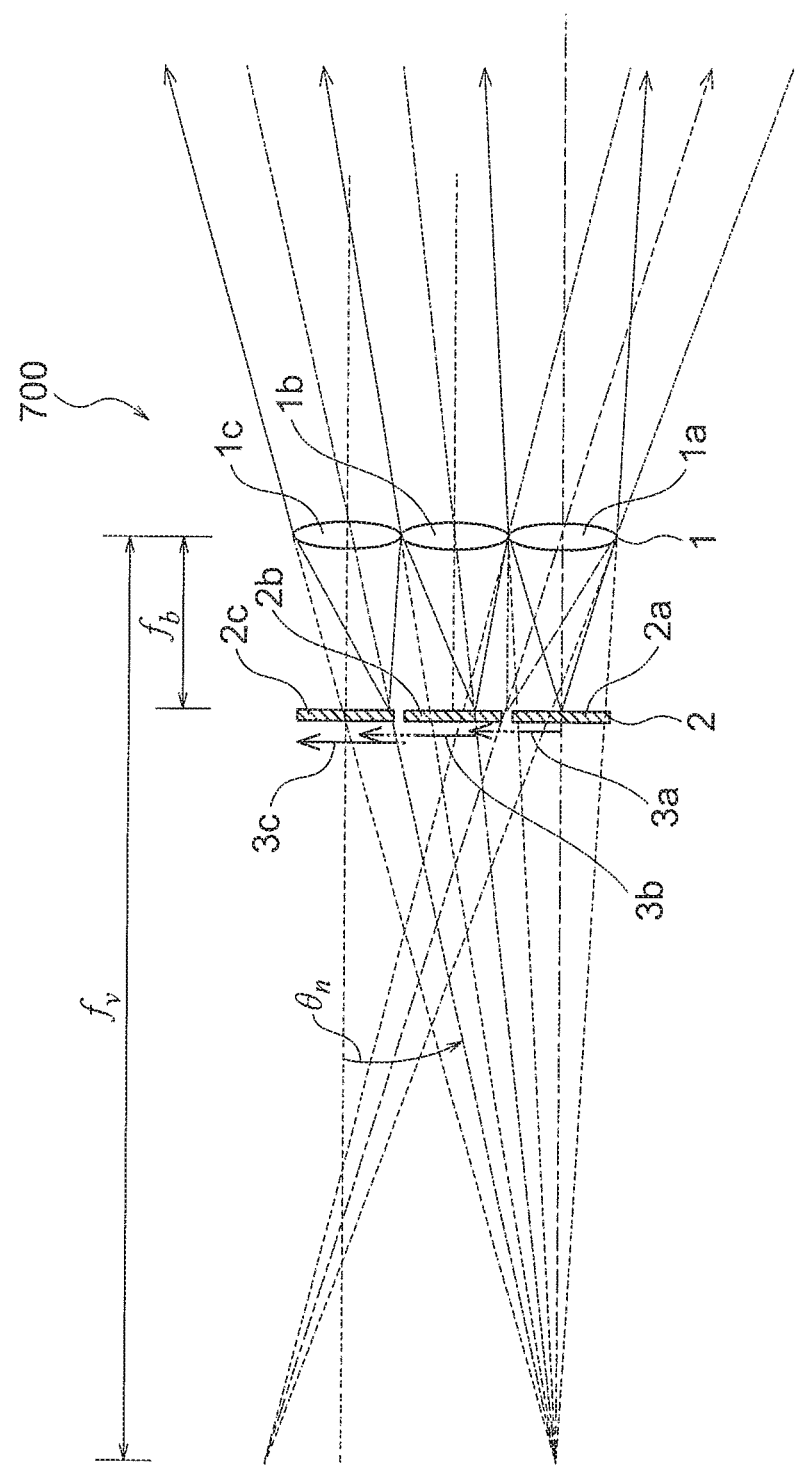
FIG. 9 is a diagram schematically showing a display apparatus according to a seventh embodiment.

FIG. 9 is a diagram schematically showing a display apparatus 700 according to a seventh embodiment. According to the display method of this embodiment, partial images 3a, 3b, and 3c (represented by the solid line portions of arrows) of an original image (represented by an arrow) are displayed in display areas (e.g. display areas 2a, 2b, and 2c) of a display device 2 corresponding to lenses (e.g. lenses 1a, 1b, and 1c) in a lens array 1.

The partial images represent different portions of the original image respectively. The lenses 1a, 1b, and 1c respectively form virtual images (not shown) of the portions of the partial images 3a, 3b, and 3c displayed in the respective display areas 2a, 2b, and 2c represented by the solid line portions of the arrows.

The virtual images of the partial images formed by the plurality of lenses 1a, 1b, and 1c are superposed to forma single virtual image (not shown). In other words, images of the partial images are arranged in such a way that a single virtual image of the partial images 3a, 3b, 3c (represented by the solid line portions of the arrows) is formed by the lenses 1a, 1b, and 1c in the lens array 1.

In the case of this embodiment, the size of the display areas 2a, 2b, and 2c is the same as the size of the lenses 1a, 1b, and 1c. It should be noted that the number of lenses in the lens arrays 1 is not limited to three. Actually the lens arrays are arranged two-dimensionally.

In the following, an exemplary method of obtaining partial images to be displayed in the display areas will be described. In the following description, D is the diameter (or pitch) of the lenses, f is the focal length, and $f_v$ is the distance from the display device to the virtual image, where $f_v$ is a finite distance. The position of the rear focal point $f_b$ can be calculated by the following equation (6).

$$\frac{1}{f} = \frac{1}{f_b} - \frac{1}{f_v}; f_v, f_b > 0 \tag{6}$$

The image height $\theta_n$ (in angle) of the original point of display by the nth lens is expressed by the following equation (7).

$$\tan\theta_n = \frac{nD}{f_v} \tag{7}$$

The highest image height $\theta_{max}$ (in angle) of the display corresponding to each lens is expressed by the following equation (8).

$$\tan\theta_{max} = \frac{D/2}{f_b} = \frac{D}{2f_b} \tag{8}$$

Figure 10A:
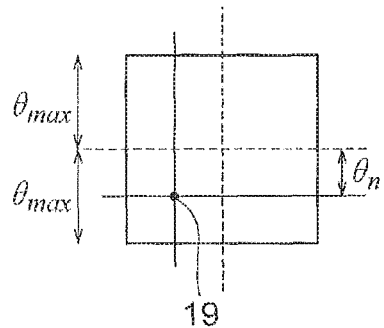
FIGS. 10A, 10B, 10C, and 10D are diagrams illustrating partial images displayed in display areas.

Therefore, the original point of display of the partial image displayed in the nth display area located below the nth lens from the center is position 19 in FIG. 10A.

In the following, exemplary numerical values will be given. In this embodiment, f=3 mm, D=1 mm, and $f_v$=250 mm. From equation (6), $f_b$=2.964 mm. The coordinate values of the partial images displayed in the nth display areas are given below for several ns.

$$\tan\theta_1 = \frac{1}{250}; \theta_1 = 0.229°$$

$$\tan\theta_{10} = \frac{1}{25}; \theta_{10} = 2.29°$$

$$\tan\theta_{100} = \frac{100}{250}; \theta_{100} = 21.8°$$

$$\tan\theta_{max} = \frac{1}{2 \times 2.964}; \theta_{max} = 9.58°$$

Figure 10B:
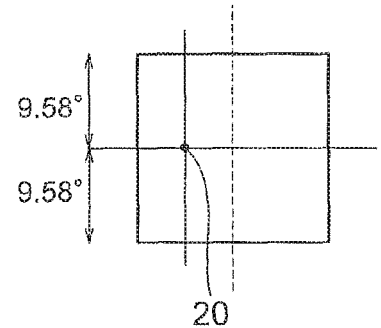
Figure 10C:
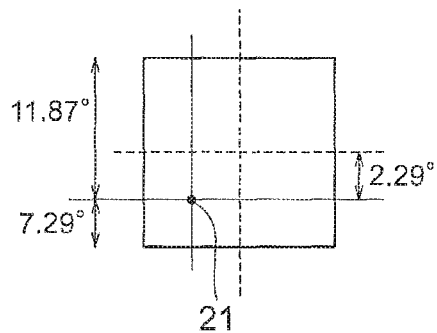
Figure 10D:
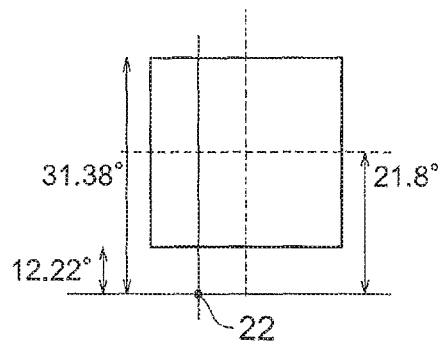

FIGS. 10B, 10C, and 10D show the original point 20 of the 0th display, the original point 21 of the 10th display, and the original point 22 of the 100th display respectively.

Figure 11:
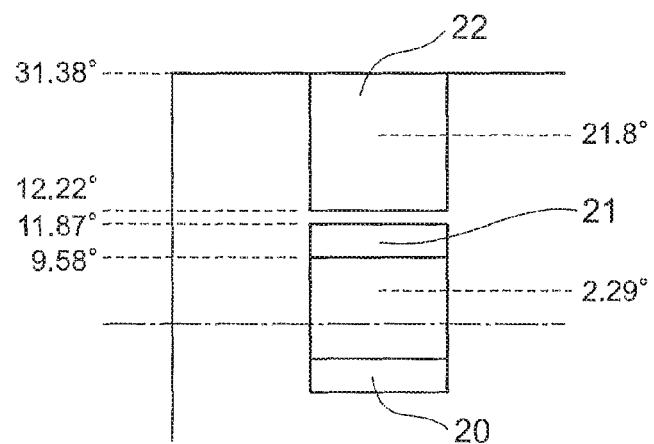
FIG. 11 is a diagram illustrating overlapping of displays.

FIG. 11 shows overlapping of the displays. If the number of lenses in one half of the lens array is 100, a display of ±31.38° can be provided.

A display area of ±9.58° in 1×1 mm square is provided. If the resolution of an eye is 1', the required number of pixels is 1150. Then, the pixel pitch is approximately 1 µm. Although the above description is about the vertical direction, the description also applies to the horizontal direction.

By providing an optical element having a convex lens effect (or positive refractive power) in front or rear of the lens array, the virtual image can be displayed at a location farther than 25 mm. If a Fresnel lens having a focal length of 250 mm is used, the virtual image can be displayed at infinity. Then, even a presbyopic eye that can focus only at distant points can see an in-focus display image on the display apparatus at a near distance.

In this embodiment, the positions of the lenses 1a, 1b . . . and the display areas 2a, 2b, . . . are not relatively shifted, unlike with the arrangement shown in FIG. 1.

Eighth Embodiment

A display apparatus according to the eighth embodiment will be described. The display device used in this embodiment is an FPD having a diagonal length of 11.9 cm (4.7 inches), a number of pixels of 29610×(RGB)×51840, and a pixel pitch of 2 μm. The size of the display area is 58.32×103.68 mm. Moreover, D=1 mm, f=3.3 mm, $f_e$=250 mm, and $f_v$=250 mm. From equation (1), $f_b$=3.26 mm. The values of $n_{max}$ and $\varphi_{nmax}$ are determined in such a way as to satisfy equation (2). In the following, calculation will be carried out in one half of the image. In the horizontal direction H=51.84 mm, and in the vertical direction H=29.16 mm. In the horizontal direction $\varphi_{nmax}$=11.5° and $n_{max}$=52, and in the vertical direction $\varphi_{nmax}$=6.5° and $n_{max}$=29. The range of the partial image displayed in the nth display area is as follows according to equation (5).

$$x_{nb} = \frac{0.01n - 0.50}{1.01} \text{ to } x_{ne} = \frac{0.01n + 0.49}{1.01}$$

Calculated values for several ns are given below.

| | | | | | |
|---|---|---|---|---|---|
| n = 52: | 0.014-1.000 | range: | 0.986 | overlapping range: | 0.976 |
| n = 51: | 0.004-0.990 | | 0.986 | | |
| n = 29: | −0.213-0.774 | | 0.987 | overlapping range: | 0.977 |
| n = 28: | −0.222-0.764 | | 0.986 | | |
| n = 2: | −0.478-0.508 | | 0.986 | overlapping range: | 0.976 |
| n = 1: | −0.488-0.498 | | 0.986 | | |

It will be understood that a range of ninety-nine hundredths of the image height of the original image is displayed in each partial image. It will also be understood that approximately ninety-nine hundredths of the partial image overlap the partial image displayed in the adjacent display area. In terms of pixels, since the pixel pitch is 2 μm, the number of pixels of the original image is 1.01/0.002=505.

Hence, the number of pixels in display is 782×1010 as follows.

number of pixels: 497
n=52: 0.014-1.000 displayed pixel number: 7-505 number of pixels: 498, number of overlapping pixels: 493
n=51: 0.004-0.990 displayed pixel number: 2-500 number of pixels: 498
n=29: −0.213-0.774 displayed pixel number: −108-391 number of pixels: 499
n=28: −0.222-0.764 displayed pixel number: −112-386 number of pixels: 498
n=2: −0.478-0.508 displayed pixel number: −241-257 number of pixels: 498
n=1: −0.488-0.498 displayed pixel number: −246-251

If the shift function described in the description of the second embodiment is employed, the total number of pixels in display can be increased to 1564×2020, which is one twentieth of the number of pixel of the display device (29610×51840).

The focal length of the lenses in the lens array can be made shorter, and the display apparatus can be made slimmer, accordingly. Moreover, the resolution can be increased greatly as compared to the prior art arrangements in which the same image is displayed in the display areas. The number of lenses in the lens array is 58×104.

In the case of the prior art arrangements, the number of pixels that can be displayed is 29610/58×51840/104=510×498. By using a convex lens optical system (having a positive refractive power), the position of the virtual image can be set to a distance. Then, even a presbyopic eye that cannot focus at a near point can see an in-focus display image easily. If a Fresnel lens having a focal length of 250 mm is used, the virtual image can be displayed at infinity.

Since the number of overlapping virtual images is 99, and the position of the virtual image is 2000 mm, the size of the bundle of beams at a viewing distance of 250 mm is evaluated to be 99×1×2250/2000=111 mm.

In the above-described embodiments, partial images of the original image is displayed in the display areas of the display device corresponding to the lenses in the lens array. The partial images are different images, and the lenses form virtual images of the respective partial images displayed in the respective display areas. The virtual images of the partial images displayed in the display areas formed by the respective lenses overlap to form a single virtual image. Thus, a high-resolution image can be displayed advantageously.

In other words, images of the partial images are arranged in such a way that a single virtual image of the partial images is formed by the lenses in the lens array. This provides the advantage that a high-resolution image is displayed as a virtual image. The number of pixels of the virtual image displayed is not limited to the number of pixels equal to the number of pixels that can be displayed on the display device divided by the number of display areas, but a larger number of pixels can be displayed.

Moreover, beams respectively emergent from the plurality of lenses gather into a big bundle of beams equivalently. This provides the advantage that the display can be viewed without the need to adjust the position of the eyes at a position away from the display apparatus, namely without looking into the display apparatus.

Displaying an image as a virtual image at a distance provides the advantage that even a person with eyes that cannot focus on a near distance at which the display apparatus is located can see an in-focus display. By using the display apparatus according to the present invention, for example even a presbyope can see an in-focus display without putting on (or taking off) reading glasses.

Moreover, the display apparatuses of the above-described embodiments reduce the burden on the eyes of the viewer, allowing the viewer to view the display without the need to additional optical components such as reading glasses. Furthermore, the apparatuses of the above-described embodiments enable a farsighted person to see an in-focus image (i.e. all the information displayed including not only pictures but also characters etc.) without wearing glasses.

The present invention can advantageously provide a practically useful display method and a practically useful slim display apparatus that enable viewers to see in-focus image easily.

As above, the present invention is suitably applied to a practically useful display method and a practically useful slim display apparatus that enable viewers to see in-focus image easily.

What is claimed is:

1. A display method for displaying a virtual image comprising:
   providing a lens array including a plurality of lenses;
   providing display areas at least one of which corresponds to each of the plurality of lenses,
   displaying partial images of an original image in the display areas respectively, the partial images being different from one another but partially including a same image portion, forming a bundle of beams by beams respectively emergent from the plurality of lenses equivalently, forming virtual images of the respective partial images displayed in the respective display areas by the respective lenses, and forming a single virtual image by superposing the virtual images of the partial images displayed in the respective corresponding display areas formed by the plurality of lenses.

2. A display method according to claim 1, wherein the partial image is an image of a portion of the original image.

3. A display method according to claim 1, further comprising providing an optical system having a convex lens effect in front or rear of the lens array.

4. A display method according to claim 1, wherein the display area includes a plurality of pixels, and pixels of two or more of the display areas overlap in the superposing of the virtual images.

5. A display method according to claim 1, wherein the display area includes a plurality of pixels, and pixels of two or more of the display areas overlap with a displacement equal to half the pitch of the pixels from one display area to another in the superposing of the virtual images.

6. A display method according to claim 1, wherein the display area includes a plurality of pixels, and pixels of two or more of the display areas overlap with a displacement equal to one third of the pitch of the pixels from one display area to another in the superposing of the virtual images.

7. A display apparatus for displaying a virtual image comprising:
a display device having pixels; and
a lens array including a plurality of lenses,
wherein the display device has display areas at least one of which corresponds to each of the plurality of lenses,
partial images of an original image are displayed in the display areas respectively,
the partial images are different from one another but partially include a same image portion,
beams respectively emergent from the plurality of lenses gather to form an equivalent bundle of beams,
the lenses form virtual images of the respective partial images displayed in the respective display areas respectively, and
the virtual images of the partial images displayed in the respective corresponding display areas formed by the plurality of lenses are superposed to form a single virtual image.

8. A display apparatus according to claim 7, wherein the partial image is an image of a portion of the original image.

9. A display apparatus according to claim 7, further comprising an optical system having a convex lens effect provided in front or rear of the lens array.

10. A display apparatus according to claim 7, wherein the display device comprises a single integral element.

11. A display apparatus according to claim 7, wherein pixels of two or more of the display areas overlap when the virtual images are superposed.

12. A display apparatus according to claim 7, wherein pixels of two or more of the display areas overlap with a displacement equal to half the pitch of the pixels from one display area to another when the virtual images are superposed.

13. A display apparatus according to claim 7, wherein pixels of two or more of the display areas overlap with a displacement equal to one third of the pitch of the pixels from one display area to another when the virtual images are superposed.

14. A display apparatus according to claim 7, wherein the display apparatus has a shift function by which the relative position of the display areas and the lens array is shifted in a direction perpendicular to the optical axis of the lenses by a distance equal to half the pitch of the pixels.

15. A display apparatus according to claim 14, wherein the shift function is provided for two dimensional directions including a horizontal direction and a vertical direction of a displayed image.

16. A display apparatus according to claim 14, wherein the shift function is implemented by a mechanical system.

17. A display apparatus according to claim 14, wherein the shift function is implemented by an optical switch using a liquid crystal.

18. A display apparatus according to claim 7, wherein the displayed portion of the partial image displayed in the display area is a portion of the original image that satisfies the following condition:

$$x_{nb} = \frac{\frac{n-1}{n_{max}}H - (f_v - f_b)\frac{(n-1/2)D}{f_v}}{H - (f_v - f_b)\frac{(n_{max}-1/2)D}{f_v}}$$

$$\frac{\frac{n}{n_{max}}H - (f_v - f_b)\frac{(n-1/2)D}{f_v}}{H - (f_v - f_b)\frac{(n_{max}-1/2)D}{f_v}} = x_{ne},$$

where $$\frac{1}{f} = \frac{1}{f_b} - \frac{1}{f_v};$$

$f_v$, $f_b > 0$, except for $f_v = \infty$ where the range "$x_{nb}$ to $x_{ne}$" is the displayed range of the partial image, H is the display height of the display area provided in the display device from an optical axis, $n_{max}$ is the number of display areas provided along the display height direction from the optical axis, n is an ordinal number of a display area representing its position in a series of display areas arranged along the direction away from the optical axis, D is the diameter of the lens, f is the focal length of the lens, and $f_v$ is the distance from the display device to the virtual image.

19. A display apparatus according to claim 7, wherein the diameter of the lens is equal to or larger than 0.3 millimeter.

20. A display apparatus according to claim 7, wherein the distance from the display device to the virtual image is equal to or larger than 2 meters.

21. A display apparatus according to claim 7, wherein the distance from a viewer to the lens array is equal to or larger than 3 centimeters.

22. A display apparatus according to claim 7, wherein the width of an eye-box at the position of a viewer is equal to or larger than 11 millimeters.

* * * * *